United States Patent
Carley et al.

(10) Patent No.: US 6,793,256 B2
(45) Date of Patent: Sep. 21, 2004

(54) VEHICLE BUMPER ENERGY ABSORBER SYSTEM AND METHOD

(75) Inventors: Michael Carley, Chesterfield, MI (US); Steven R. Sopher, Pittsburgh, PA (US)

(73) Assignee: JSP Licenses, Inc., Wilmington, DE (US)

( * ) Notice: Subject to any disclaimer, the term of this patent is extended or adjusted under 35 U.S.C. 154(b) by 0 days.

(21) Appl. No.: 10/317,620

(22) Filed: Dec. 12, 2002

(65) Prior Publication Data

US 2003/0111852 A1 Jun. 19, 2003

Related U.S. Application Data

(60) Provisional application No. 60/341,353, filed on Dec. 17, 2001.

(51) Int. Cl.[7] .............................................. B60R 19/22
(52) U.S. Cl. ....................... 293/109; 293/120; 293/110
(58) Field of Search ................................ 293/109, 120, 293/110; 264/226, 50

(56) References Cited

U.S. PATENT DOCUMENTS

| | | | | |
|---|---|---|---|---|
| 3,666,310 A | * | 5/1972 | Burgess et al. ............. | 293/109 |
| 4,061,384 A | * | 12/1977 | Montgomery et al. ...... | 293/109 |
| 4,106,804 A | * | 8/1978 | Scrivo ......................... | 293/109 |
| 4,109,951 A | * | 8/1978 | Weller ......................... | 293/109 |
| 4,427,189 A | | 1/1984 | Kimura et al. | |
| 4,456,443 A | | 6/1984 | Rabotski | |
| 4,504,534 A | | 3/1985 | Adachi et al. | |
| 4,569,865 A | * | 2/1986 | Placek ......................... | 293/109 |
| 4,635,984 A | * | 1/1987 | Loren et al. ................. | 293/120 |
| 4,652,031 A | * | 3/1987 | Loren et al. ................. | 293/120 |
| 4,722,563 A | * | 2/1988 | Loren et al. ................. | 293/120 |
| 4,756,948 A | | 7/1988 | Kuramochi et al. | |
| RE32,780 E | | 11/1988 | Yoshimura et al. | |
| 4,834,929 A | * | 5/1989 | Dehoff et al. ............... | 264/226 |
| 4,904,008 A | | 2/1990 | Glance | |
| 4,941,701 A | * | 7/1990 | Loren .......................... | 293/109 |
| 4,988,137 A | * | 1/1991 | Fleming ...................... | 293/109 |
| 5,067,759 A | * | 11/1991 | Fleming ...................... | 293/109 |
| 5,100,187 A | * | 3/1992 | Loren .......................... | 293/110 |
| 5,106,137 A | * | 4/1992 | Curtis ......................... | 293/109 |
| 5,248,459 A | | 9/1993 | Fukasawa et al. | |
| 5,255,487 A | | 10/1993 | Wieting et al. | |
| 5,265,925 A | * | 11/1993 | Cox et al. ................... | 293/120 |

(List continued on next page.)

FOREIGN PATENT DOCUMENTS

| | | | |
|---|---|---|---|
| GB | 2 185 714 A | | 7/1987 |
| GB | 2 185 714 | * | 7/1987 |
| JP | 61 89146 | * | 5/1986 |
| JP | 62 94453 | * | 4/1987 |
| JP | 1 309845 | * | 12/1989 |
| JP | 2 206520 | * | 8/1990 |

OTHER PUBLICATIONS

International Search Report dated May 2, 2003, for International Application No. PCT/US02/39838.

*Primary Examiner*—Kiran Patel
(74) *Attorney, Agent, or Firm*—Caesar, Rivise, Bernstein, Cohen & Pokotilow, Ltd.

(57) ABSTRACT

A vehicle bumper energy absorbing system is provided that includes molded foam and at least one integral reinforcing member. The molded foam surrounds the reinforcing member on at least one side. The molded beam foam is adapted to absorb impact energy and distribute impact forces to the reinforcing member. Preferably, the reinforcing member is at least partially or fully encapsulated in the molded foam. The reinforcing member may be of a plate shape. Fasteners are preferably used to enable the vehicle bumper energy absorbing system to be mounted to a vehicle frame. Preferably, the fasteners are integral to the molded bead foam or integral to the reinforcing member. Preferably, the vehicle bumper energy absorbing system is adapted to be manufactured in a single step process, wherein the thermoplastic bead foam encapsulates the reinforcing member.

19 Claims, 5 Drawing Sheets

U.S. PATENT DOCUMENTS

| | | | |
|---|---|---|---|
| 5,290,078 A | * 3/1994 | Bayer et al. | 293/120 |
| 5,385,375 A | * 1/1995 | Morgan et al. | 293/109 |
| 5,425,561 A | 6/1995 | Morgan | |
| 5,474,841 A | * 12/1995 | Matsuki et al. | 264/50 |
| 5,498,045 A | 3/1996 | Morgan et al. | |
| 5,681,519 A | 10/1997 | Kelman | |
| 5,746,419 A | 5/1998 | McFadden et al. | |
| 5,799,991 A | 9/1998 | Glance | |
| 5,800,749 A | 9/1998 | Lewit et al. | |
| 5,884,960 A | 3/1999 | Wycech | |
| 5,992,923 A | 11/1999 | Wycech | |
| 5,997,057 A | 12/1999 | Gasko et al. | |
| 6,003,274 A | 12/1999 | Wycech | |
| 6,092,864 A | 7/2000 | Wycech et al. | |
| 6,168,226 B1 | 1/2001 | Wycech | |
| 6,199,940 B1 | 3/2001 | Hopton et al. | |
| 6,233,826 B1 | 5/2001 | Wycech | |
| 6,286,897 B1 | 9/2001 | Ruhter et al. | |
| 6,305,136 B1 | 10/2001 | Hopton et al. | |
| 6,318,775 B1 | * 11/2001 | Heatherington et al. | 293/120 |

* cited by examiner

VEHICLE BUMPER ENERGY ABSORBER SYSTEM AND METHOD

CROSS-REFERENCE TO RELATED APPLICATIONS

This application claims priority to U.S. Provisional Application No. 60/341,353 for a Vehicle Bumper Energy Absorber System and Method, filed Dec. 17, 2001.

BACKGROUND OF THE INVENTION

This invention relates to vehicle bumper energy absorbers used on vehicles within the automotive and light truck market, and will allow for a totally integrated bumper system providing both energy absorption and structural integrity, as well as a core for which to mount a vehicle's fascia.

Substantially all vehicle bumper systems are designed to serve several functions, one of which is to minimize damage to the vehicle body during low speed impacts (typically defined as less than 5 miles per hour), another is to manage the energy resulting from the impact. A properly designed bumper system will withstand these low speed impacts with no or minimal damage to the bumper system or to other vehicle components. A properly designed bumper system will repeatably manage the energy during these low speed impacts without permanent damage to the bumper system or to other vehicle components.

A goal of generally any bumper system is to provide a design that is lightweight and has the ability to manage kinetic energy created during bumper impact incidents, as indicated above. The bumper system must also be designed for strength and be resistant to excessive torsion and flexing.

A well designed bumper system will allow for full bumper fascia support and optimal cross sectional areas adequate to meet the vehicle off-set (allowable stroke) requirements, while minimizing material usage, and, at the same time, reducing total system weight. It is also desirable to minimize the use of bumper system fasteners and/or adhesives used in the assembly of these systems.

The present invention meets the above mentioned requirements and provides a high performance bumper energy management system, while incorporating a simple, preferably single step, commercial manufacturing process, and, at the same time, reduces the number of components to reduce the cost of assembly.

There are a number of related patents that deal peripherally with the present invention. For example, U.S. Pat. No. 5,255,487 (Wieting et al.) discloses a door reinforcement beam for use in a passenger vehicle which includes a base tube made of a metal and a reinforcing section attached to the tube which is also made of a metal.

U.S. Pat. No. 5,884,960 (Wycech) discloses a reinforced door beam that has a hollow shell within an internal localized reinforcement. The localized internal reinforcement includes an inner shell which is spaced apart from the door beam shell by a layer of thermally expanded resin.

U.S. Pat. No. 5,992,923 (Wycech) discloses a reinforced beam assembly that includes a channel shaped beam which has an internal reinforcement member located within the channel. The reinforcement member is of a W-shape and functions as a carrier for an expandable foam located between the inner and outer surface of the reinforcement member and the inner surface of the beam. Upon expansion, the foam is bonded to both surfaces.

U.S. Pat. No. 6,003,274 (Wycech) discloses a lightweight structural reinforcement that spans a space in a structural member. The reinforcement functions as a web and has a metal plate, a layer of foam, and a thin, metal reinforcement selectively positioned at the midportion of the reinforcement. Unexpanded foam at the end portions of the plate serves as an adhesive to bond the reinforcement to the structural member being reinforced.

U.S. Pat. No. 6,092,864 (Wycech et al.) discloses a laminate for reinforcing a structural member having side walls. The laminate has a carrier having at least one inclined support surface. Each support surface has an outer edge disposed toward a respective side wall. A layer of extruded, uncured structural foam is on each support surface and terminates inwardly off the outer edge. The foam expands when cured and tumbles down the inclined support surface of the carrier to become bonded to the side wall as well as the carrier.

U.S. Pat. No. 6,168,226 (Wycech) discloses a laminate support beam that includes an outer structural member which has a channel shape with a longitudinal rigid inner member precoated with structural foam to form a drop-in insert unit which is dropped into the channel of the outer structural member. The structural foam is heat expandable to intimately bond to the inner surface of the outer member and provide a reinforcement for the outer member.

U.S. Pat. No. 6,199,940 (Hopton et al.) discloses a reinforcing member for receiving thereon a thermally expansible reinforcing material. The member includes a tubular carrier and a fastener mechanically affixing the reinforcing material to the carrier. The tubular carrier has a continuous arcuate wall with the reinforcing material received on the exterior thereof. The reinforcing material may be provided as a plurality of longitudinally spaced annular elements, an elongated sleeve, or a plurality of prism-shaped elements. Upon heating, the reinforcing material expands and bonds the carrier to the structural member to provide additional strength and stiffness.

U.S. Pat. No. 6,233,836 (Wycech) discloses a method for reinforcing a selected portion of a structural part which utilizes a flexible tube having an unexpanded, thermally expandable resin sheath. The sheath may be limited to a selected region along the length of the flexible tube. The flexible tube is inserted through a curved passage and conforms to the geometry of the part to be reinforced. After the portion of the tube having the sheath reaches the desired location, the tube is secured in place. Upon heating, the resin expands to several times its original volume and fills the structural cavity only at that region.

U.S. Pat. No. 6,305,135 (Hopton et al.) discloses a reinforcing member for a structural component such as a rail or channel of a vehicle which includes a carrier and a thermally expansible structural reinforcing material element which is fastened to the carrier by mechanical fixation or an adhesive. The mechanical fixation may be provided by a flange or other mechanical connection on the carrier or by a fastener such as a push pin extending through aligned holes and openings in the carrier and foamable material. The push pins are of a synthetic resin material which more closely approximates the heat conductivity of the foamable material when they are activated by heat, and are sufficiently yieldable to absorb impacts to the foamable material during installation.

Finally, U.S. Pat. No. 4,456,443 (Rabotski) discloses a steam chest molding process in general, wherein articles such as foamed boards or sheets are molded from expanded foam material, such as polystyrene. A cavity is filled with beads of partially expanded polystyrene and steam is used to completely expand the beads. The foam is then cooled with water.

All references cited herein are incorporated herein by reference in their entireties.

BRIEF SUMMARY OF THE INVENTION

The present invention is directed to a one-piece vehicle bumper energy absorber system containing a densified molded foam and at least one bumper beam reinforcing member. During a low speed impact (5 miles per hour or less), upon impact, as the densified molded bead foam compresses within or around the reinforcing member, it will partially absorb the kinetic energy of the impact, thus reducing the abruptness of the initial impact. The reinforcing member minimizes any torsional forces, allows for adequate energy absorption, and prevents damage to the vehicle body and related components.

Once the initial impact occurs, and after the kinetic energy is absorbed and the impactor is removed, the bumper system rebounds to its normal free state. This rebound results from the stiffness of the bead foam in conjunction with the reinforcing member.

Upon the initial vehicle impact, which results in deformation of the bead foam and the transmission of the compressive forces, the system will distribute the load throughout the bumper system and into the frame of the vehicle. It is the systematic balance of the energy absorption rate and subsequent transfer of energy within the vehicle that minimizes any damage to the body of the vehicle.

The present invention is directed to a vehicle bumper energy absorbing system that includes molded foam and an integral reinforcing member. The molded foam at least partially encapsulates the reinforcing member. The molded beam foam is adapted to absorb impact energy and distribute impact forces to the reinforcing member. The reinforcing member may be of a plate shape. Fasteners are preferably used to enable the vehicle bumper energy absorbing system to be mounted to a vehicle frame. Preferably, the fasteners are integral to the molded bead foam or integral to the reinforcing member. Preferably, the vehicle bumper energy absorbing system is adapted to be manufactured in a single step process, wherein the thermoplastic bead foam encapsulates the reinforcing member.

The reinforcing member may be, for example, a stamped plate, a rolled beam, an extruded shaped beam, or a molded beam or plate. The reinforcing member may be, for example, stamped metal, a plastic beam, or a thermoformed beam comprised of metal or a composite blend.

Optionally, the reinforcing member may contain holes (including slots) where the molded bead foam has passed through. The reinforcing member may have barbs on one or more outer surface for enhanced securement of the molded bead foam to the reinforcing member. The length of the reinforcing member may range, for example, from 50 mm to 1000 mm as measured from the centerline of the vehicle bodyline.

Optionally, a fascia layer is located adjacent to at least one surface of the bumper energy absorbing system. The fascia is integral to the bumper energy absorbing system.

A method of making a vehicle energy absorbing system is also provided which generally includes the steps of providing a pair of mold halves that close to form a mold cavity adapted to be used in a steam chest molding process, providing a reinforcing member into the mold cavity, applying foam beads into the mold cavity such that the reinforcing member is encapsulated by the foam on at least one side, and densifying the foam beads within the mold cavity. The reinforcing member may be temporarily positioned within the mold cavity to allow the bead foam to be injected around or within it. The step of densifying the foam beads within the mold cavity may include utilizing mechanical pressure through the use of a telescoped mold cavity. The step of densifying the foam beads within the mold cavity may also include utilizing air pressure through the use of a pressurized air within the range of 0.5 bar to 5.0 bar. This process is commonly referred to as 'pressure fill' technology within the industry.

A compression chest molding technique may also be used preferably including injecting high pressure steam within the range of, e.g., 1.5 to 5.5 bar into the mold cavity through vents contained within the mold cavity subsequent to the step of applying foam beads into the mold cavity. This is a steam chest molding technique, wherein high pressure steam (within the range of, e.g., 1.5 to 8.0 bar) is injected into the mold cavity through vents contained within the mold cavity. These mold cavity vents (referred to as 'core-vents') may be present on one or both sides of the mold cavities.

The step of providing the pair of mold halves may include providing a single molding tool containing multiple mold cavities. The step of densifying the foam beads may include densifying the foam beads to a final foam density of, for example, between about 20 grams/liter and 350 grams/liter or about 15 grams/liter and 300 grams/liter. The step of densifying the foam beads may include densifying the foam beads to a plurality of foam densities within the same part. A step of cooling the mold halves may be used to facilitate proper annealing of the expanded bead foam in and/or around the reinforcing member.

The method may include the step of applying a fascia to at least one surface of the foam beads within the mold. Preferably, the steps of providing the pair of mold halves, providing the reinforcing member into the mold cavity, applying foam beads into the mold cavity, and densifying the foam beads within the mold cavity all occur in a single molding operation. Alternatively, the steps of providing the pair of mold halves, providing the reinforcing member into the mold cavity, applying foam beads into the mold cavity, densifying the foam beads within the mold cavity, and applying a fascia, all occur in a single molding operation.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
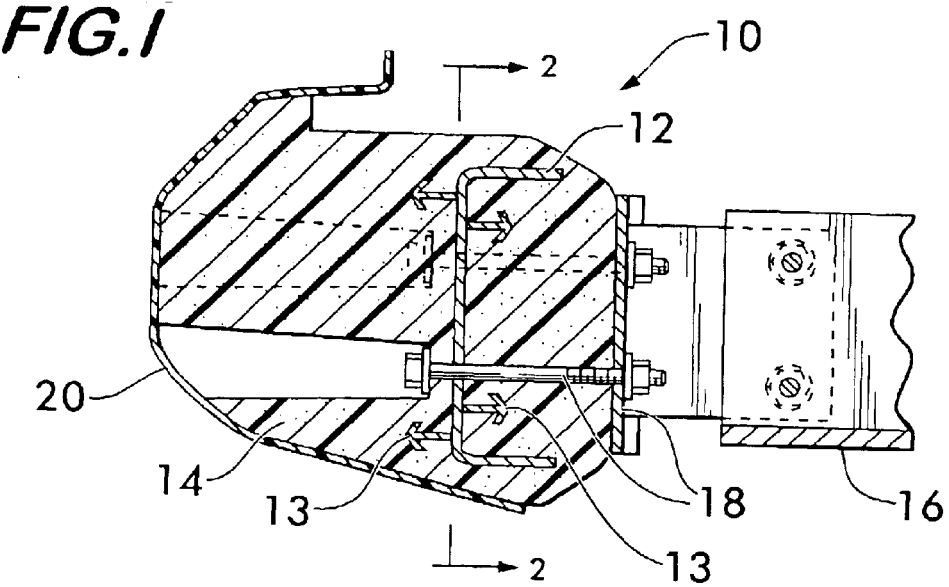
FIG. 1 is a side, cross-sectional elevational view of a vehicle bumper energy absorber system in accordance with a first preferred embodiment of the present invention, depicting a first reinforcing member cross section.

For purposes of the present invention, the following terms are defined as follows:

"Incapsulation"—adding, for example, expanded polypropylene (EPP) to the inside of a closed or partially closed metal or composite reinforcing member cross section in a one step molding process. This can either be the full length of the inserted beam, or in local areas. More than one density of the EPP may be used on the inside of the reinforcing member.

"Encapsulation"—adding, for example, EPP to the exterior of the metal or composite reinforcing member in a one step molding process. This process is essentially a parts consolidation. For lowest piece price and system weight, this may be in "localized bands". The encapsulated density will be "low" density in almost all applications. For a traditional dual density energy absorber system, the band will be in the same basic location as the low density portion of the energy absorber.

"Insert"—any item or combinations of items that are inserted into the EPP molding press either manually (by hand), robotically, or using a frame (where, e.g., the frame is manually loaded).

"Steam Chest Molding"—a very low pressure molding process whereby foamed particles are injected under very low pressure into a net shape tool. Low pressure steam is utilized to expand the particles to form a "fusion" bond between adjacent particles. Cooling water is typically used to stabilize the molded parts and enhance ejection. Mechanical and/or pneumatic ejection removes the molded parts from the tool.

"Fusion"—the degree of permanency (which takes place during the manufacturing step) of the interconnectivity between the individual beads of the EPP.

"Pressure Fill"—one of two main expanded bead molding techniques. Compressed air is used to compress the EPP particles during the fill stage to enhance final part shape and performance.

"Crack Fill"—one of two main expanded bead molding techniques. The hydraulics of a molding press are used to compress the EPP particles during the fill stage to enhance final part shape and performance. The tool must have "telescope" (see definition below) built into it.

"Telescope"—Parts that must be crack filled (e.g., where final molded densities are greater than 80 grams/litre) need to have "telescope" built into the tools. Telescope is extra metal depth, that has zero degrees of draft, at all parting line surfaces. It is typically 25 mm deep. This will allow the tool to be opened upon the initial filling step. In effect, extra foam particles are injected into the tool. The hydraulics of the press then "close" the tool such that the parting lines touch.

"Parting Line"—the location on a part where the cavity and core tool halves either meet (matched parting line technique) or slide by each other (telescope parting line technique). Each half of the tool is mounted to the separate sides of the press. There is only a small amount of airgap between the tool halves at this location. This is where "flash" will occur.

"Flash"—if there is a sufficient airgap between the metal of the two tool halves mounted to the separate halves of a given molding press) and/or sufficient injection pressure, the raw material will flow into the metal recesses. This creates some degree of extra non-useful material molded onto the final part. This subsequently needs to be trimmed off for an acceptable part.

"Matched Parting Line"—this term refers to tools where the core and cavity "kiss off" each other. This is used for pressure fill only (and not for crack fill). This is extremely common in the injection molding industry.

"Core-vent"—steam must be allowed to flow adjacent to or through the EPP particles to enable molded fusion to occur. A typical tool will have relatively thin metal, e.g., about 15 mm in thickness. In order to allow steam to move from inside the "steam chest" through the EPP particles, passageways must be created. The passageways are typically holes drilled through the tool thickness. These can range from 0.5 mm in diameter to 20 mm in diameter. The most common range is 8–12 mm in diameter. Typically, these are spaced on one inch centerlines. In order to allow steam to pass through but prevent material from flowing into the steam chest, core-vents must be installed into the drilled holes. These typically are slightly larger in diameter and/or knurled so as to cause an interference fit to the holes drilled in the castings. As one looks at a molded part, one can see the "patterns" that the core vents create.

"Non-Core Vented Tool Surface"

a. For fusion purposes—in some applications, the steam energy inside the steam chest is used to heat the tool surface. Through the metal tool thickness, conductive heat is transferred to the loose EPP particles. Sufficient energy is generated to provide adequate fusion to the EPP particles.

b. for aesthetic purposes—in some applications, the resultant demarcation of the core vents is objectionable for the final end use. Core vents are then not used.

c. for "fusing the EPP particles inside of the metal beam"—in one of the two main molding techniques for the present invention, it may be desirable to prevent steam from the male mold half (moving side) from seeing any path other than from the moving chest through special fill guns to the EPP beads inside of the reinforcing member, through the ends/holes/perforations in the front face of the reinforcing member, through the energy absorber portion EPP particles, through the corevents of the female mold half, and to the fixed chest.

"Core"—this is one side of the tool. Within the EPP industry, the core half of the tool is usually mounted to the moving side of the press. This is also known as the "male" mold half.

"Cavity"—this is one side of the tool. Within the EPP industry, the cavity half of the tool is usually mounted to the fixed side of the press (along with the fill guns and ejectors). This is also known as the "female" tool half.

"Lateral Cross Section"—this is also referred to as a "Y" cross section. It describes using a plane in the XZ coordinate system to "slice" the overall cross section. The centerline of the vehicle (across the vehicle width) is known as Y=0.

"Longitudinal Cross Section"—this is also referred to as a "Z" cross section. It describes using a plane in the XY coordinate system to "slice" the overall cross section.

"FMVSS"—Federal Motor Vehicle Safety Standards. This includes the bumper impact standard the USA automakers are required to pass. The particular standard is FMVSS 581.

"NHSTA"—National Highway Safety and Transportation Authority, a U.S. regulatory board.

"IIHS"—Insurance Institute for Highway Safety—Essentially, this is the primary agency that does independent testing on vehicles. It does several unique tests that the OEMs may not specifically design a particular platform to pass. Vehicles are evaluated by independent insurance adjusters for the dollar damage for replacement parts after the impact testing. Like vehicles are grouped and force ranked. The OEMs do not like to be in the "most expensive to fix" spot in the particular vehicle category.

"Impact energy"—essentially, this relates to the mass of the vehicle and the initial impact velocity (generally at 5.0 mph).

"Vehicle Offset"—The distance from the initial "touch" of the particular impactor shape (e.g., flat barrier; pendulum; 7" diameter rear pole) to the damageable surface on the particular vehicle.

"Rebound"—the measure of how well a bumper system recovers towards the original shape after a dynamic impact test. A low degree of rebound is when component parts have a large degree of permanent set. The goal of a given bumper system is typically to have near 100% rebound, in case a bumper system would get impacted again.

"Vehicle Frame Rail"—the longitudinal steel channel on either side of the center of the car, running most of the length of the car. Many overall car components are mounted to the rails. Many of these are now being formed by the hydroforming process. The mounting brackets from the metal beam typically attach to the frame rails.

"Sweep"—this refers to the curvature of the bumper system, as viewed from the plan view.

"Laminated technology"—this refers to utilizing a skin-forming process to place either a highly aesthetic TPO or PVC skin "covering" on the exterior of the components that manage the impact energy.

"PVC Skin"—skins made of PolyVinyl Chloride.

"TPO Skin"—skins made of ThermoPlastic Olefin.

"Low speed collision"—typically, this refers to either 5 mph (8 km/hr) or 3 mph (5 km/hr) impact testing.

Various Impact Tests:
  a. "corner hit"—30% angle; standard pendulum face impactor; 3 mph velocity;
  b. "outboard hit"—straight on hit; standard pendulum face impactor; 5 mph velocity;
  c. "flat barrier hit"—straight on hit; flat wall; 5 mph velocity;
  d. "rear pole hit"—driven by IIHS. 7 inch diameter round pole impactor; Rear bumpers only; 5 mph velocity;
  e. "Front IIHS corner"—45 degree angle; flat wall; 5 mph;
  f. "Danner Impact Test"—used only in Europe; and
  g. "Pedestrian Safety Test"—Used only in Europe and Japan.

"PIM Inserts"—Plastic Injection Molded Insert. These are separately molded pieces. They are often from the polyolefin family. The typical wall stock is from 0.5 mm to 5.0 mm thick. They would be used in place of the high density EPP component of the energy absorber portion.

"Cross steam"—for example, with the tool closed and the moving side drains closed, steam from the moving side is applied. The opposite side drains (fixed side) are open to some degree. Steam will travel from the moving side chest through the core vents on the male tool to the EPP particles; through the core vents on the opposite (female side); into the fixed side chest; and down the drain of the fixed side. Also, one can close the fixed side drains and open the moving side drains and apply steam from the fixed side to get the reverse steaming effect.

"Autoclave"—with the tool closed and both drains closed, steam is applied. The EPP particles will see the steam. This is essentially "baking" the EPP. Often, autoclave is used after the two separate cross steams are done.

"Preheat"—utilizing steam energy, male and female tool surfaces of the tool are heated before injecting any EPP particles. This can also be described to heat any other component (e.g., a reinforcing beam, etc.) that is between the core and cavity tool halves.

Referring now to the drawings, wherein like reference numbers relate to like elements throughout the several views, there is shown in FIG. 1, a cross-section of a vehicle bumper energy absorber system 10 in accordance with a first preferred embodiment of the present invention. As can be seen in FIG. 1, the bumper energy absorber system 10 includes an integrated reinforcing member 12 contained within or, alternatively, adjacent to energy absorbing molded bead foam 14. The energy absorber system 10 (bumper) with the reinforcing member 12 contained therein, is mounted directly to a vehicle frame or rail 16 with fasteners or mounting brackets 18. The fasteners 18 are preferably captive fasteners, i.e., at least one element of each fastener 18 is contained within the reinforcing member and molded within the system, or separate fasteners, i.e., loose fasteners. Once the bumper energy absorber system 10 is fastened to the vehicle frame or rail 16, a fascia 20 (bumper cover) is installed, either fastened to the vehicle bumper energy absorber system 10 or to a vehicle body panel or panels (not shown). Alternatively, the fascia 20 may be incorporated integrally into the bumper energy absorber system 10 in its molding process described herein.

The shape of the molded bead foam 14 of the vehicle bumper energy absorber system 10 can be designed to accommodate a specific shape of the reinforcing member 12 as well as the design of the vehicle frame or rail 16 and applicable mounting configuration and hardware.

Figure 2:
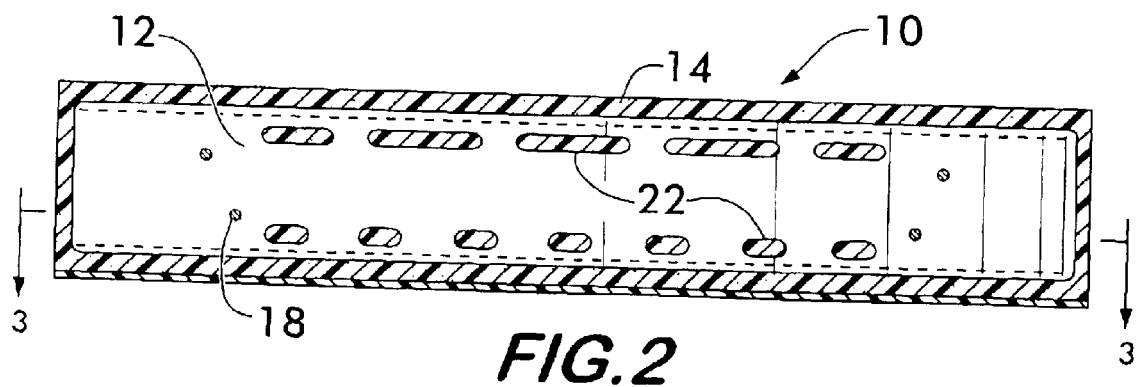
FIG. 2 is a front, cross-sectional, elevational view of the vehicle energy absorber system of FIG. 1.

Referring now to FIG. 2, which depicts a full front, elevational view of the vehicle bumper energy absorber system 10, the relationship of the reinforcing member 12 to the molded bead foam 14 is clearly depicted. Here, the molded bead foam 14 is shown covering an entire reinforcing member 12. Alternatively, the bead foam 14 may cover only a portion of the reinforcing member 12. The design of the reinforcing member 12 facilitates full encapsulation by the bead foam within and/or around the reinforcing member 12, or a portion thereof, due to use of the numerous holes and/or slots 22. This design allows for the bead foam 12 to provide a more robust encapsulation so that during a filling (bead foam injection) step during the manufacturing process, the foam material will be optimally distributed. This design also facilitates a subsequent molded bead 'fusion' step, whereby steam is injected with mold cavities, and travels both around the reinforcing member 12 and through the holes and/or slots 22 contained within the reinforcing member 12, thereby facilitating proper joining of the reinforcing member 12 to the molded bead foam 14.

Optionally, as seen in FIG. 1, barbs 13 assist in securing the molded bead foam 14 to the reinforcing member 12.

Figure 3:
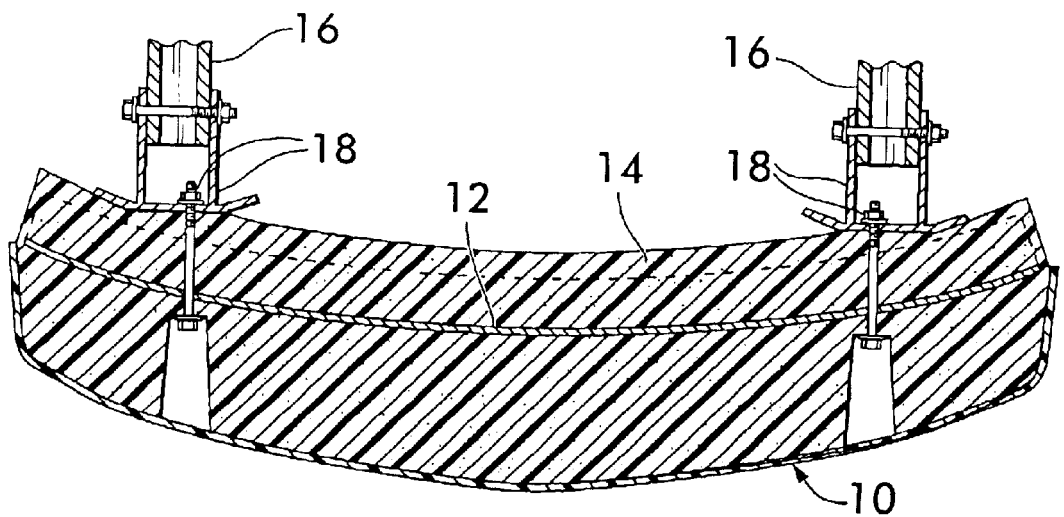
FIG. 3 is a top, plan, cross-sectional view of the vehicle energy absorber system of FIG. 1.

FIG. 3 depicts a top, plan, cross sectional view of the vehicle bumper energy absorber system 10 and shows an example of a preferred design and layout of fasteners 18. While the bumper energy absorber system 10 maintains the required system 'sweep' or curvature relative to the vehicle frame or rails 16, the fasteners 18 and bead foam 14 design allow perpendicular insertion and mounting of the fasteners 18 relative to the frame or rail 16.

Figure 4A:
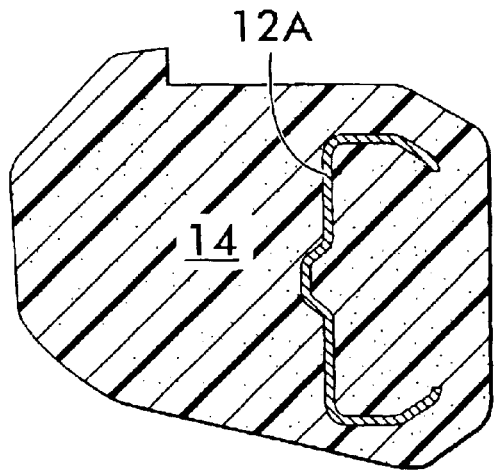
FIG. 4A is a simplified, cross-sectional, elevational view of the vehicle bumper energy absorber system of FIG. 1 depicting a second reinforcing member cross section;.
Figure 4B:
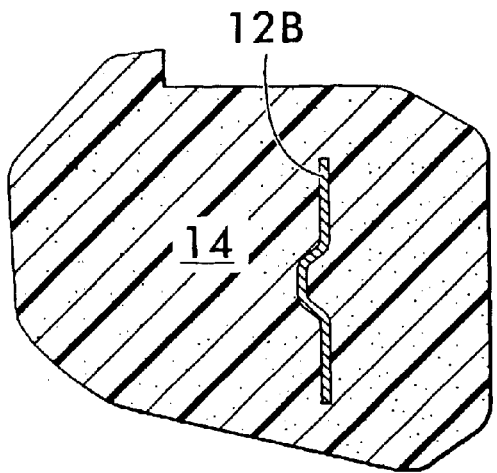
FIG. 4B is a simplified, cross-sectional, elevational view of the vehicle bumper energy absorber system of FIG. 1 depicting a third reinforcing member cross section.
Figure 4C:
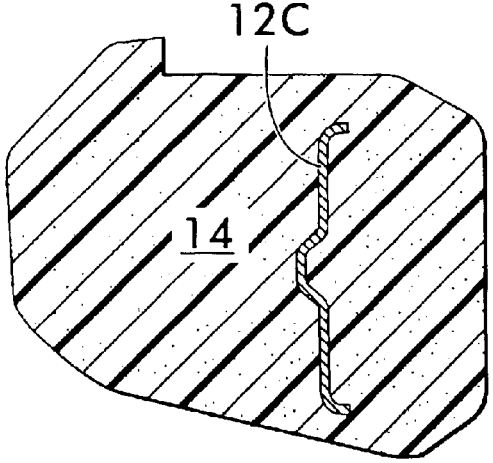
FIG. 4C is a simplified, cross-sectional, elevational view of the vehicle bumper energy absorber system of FIG. 1 depicting a fourth reinforcing member cross section.
Figure 4D:
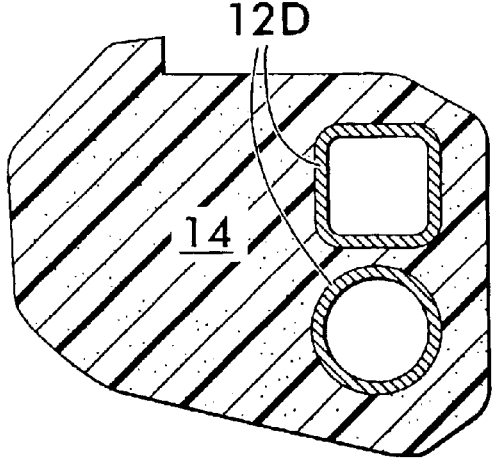
FIG. 4D is a simplified, cross-sectional, elevational view of the vehicle bumper energy absorber system of FIG. 1 depicting a fifth reinforcing member cross section.
Figure 4E:
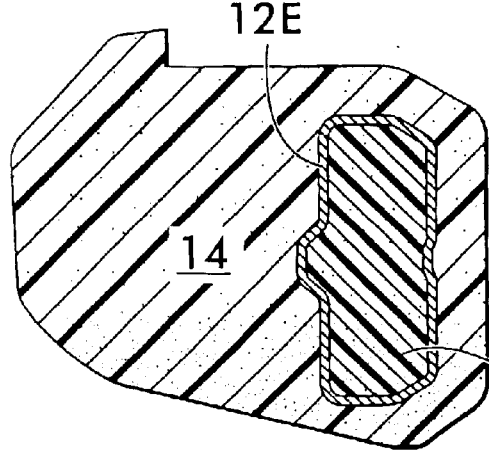
FIG. 4E is a simplified, cross-sectional, elevational view of the vehicle bumper energy absorber system of FIG. 1, depicting a sixth reinforcing member cross-section; here, the reinforcing member is tubular which allows its central section to be filled (or not filled) with foam material.

FIGS. 4A through 4E depict several alternate examples of cross-sectional shapes of reinforcing members 12A, 12B, 12C, 12D, 12E that are satisfactory for use. Of course, a multitude of other similar shapes may also be used, depending on the performance and design requirement of the vehicle and the OEM requirements. The shapes may range from, for example, a stamped plate 12B (FIG. 4B) to a complex roll formed shape 12A, 12C, 12D (FIGS. 4A, 4C, 4D) or a pipe or conduit shape 12E (FIG. 4E). With respect to the pipe or conduit shape 12E, The internal portion of the pipe may or not be fully or partially "incapsulated" with foam, as described below. See definition of "incapsulated" (as opposed to "encapsulated") as described above. Each reinforcement member shape will require unique mounting hardware within the molding cavities to accommodate the relative design location, and assure manufacturing repeatability.

Figure 5:
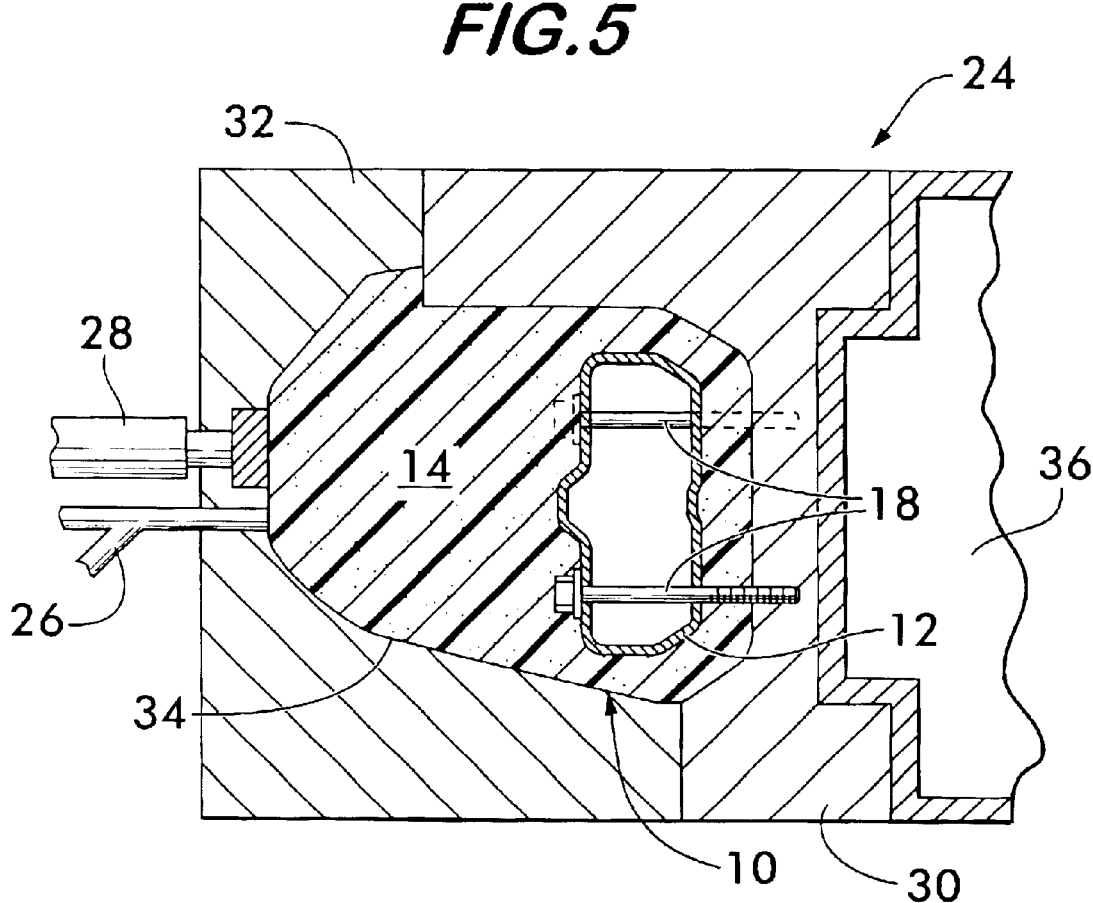
FIG. 5 is a simplified, cross-sectional, side elevational view of a system for manufacturing the vehicle bumper energy absorber system of FIG. 1.
Figure 6:
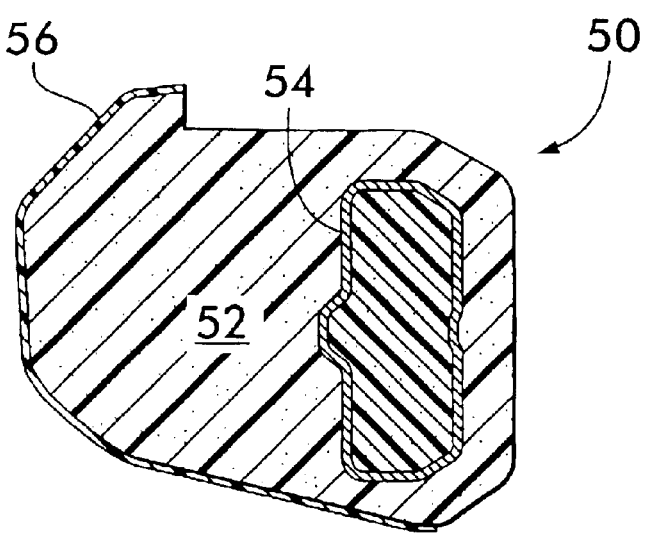
FIG. 6 is a simplified, cross-sectional, elevational view of the vehicle bumper energy absorber system of FIG. 4E, additionally showing an integral fascia.
Figure 7:
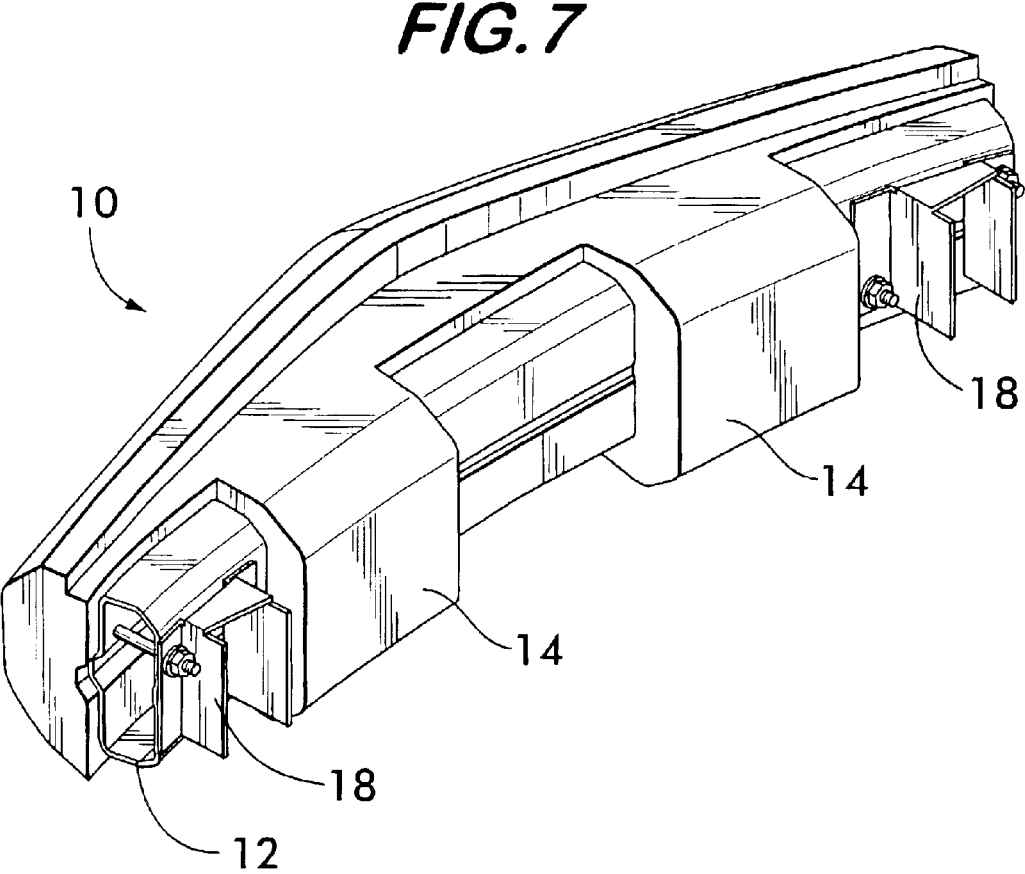
FIG. 7 is a simplified, isometric view of the vehicle bumper energy absorber system of FIG. 1, showing the reinforcing member cross section of FIG. 4E.
Figure 8:
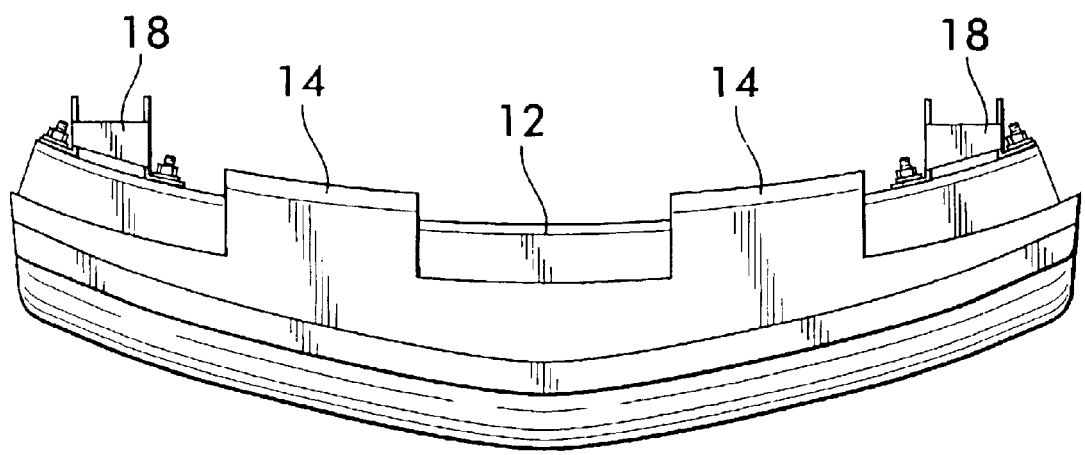
FIG. 8 is a simplified, top, plan view of the vehicle bumper energy absorber system of FIG. 7.
Figure 9:
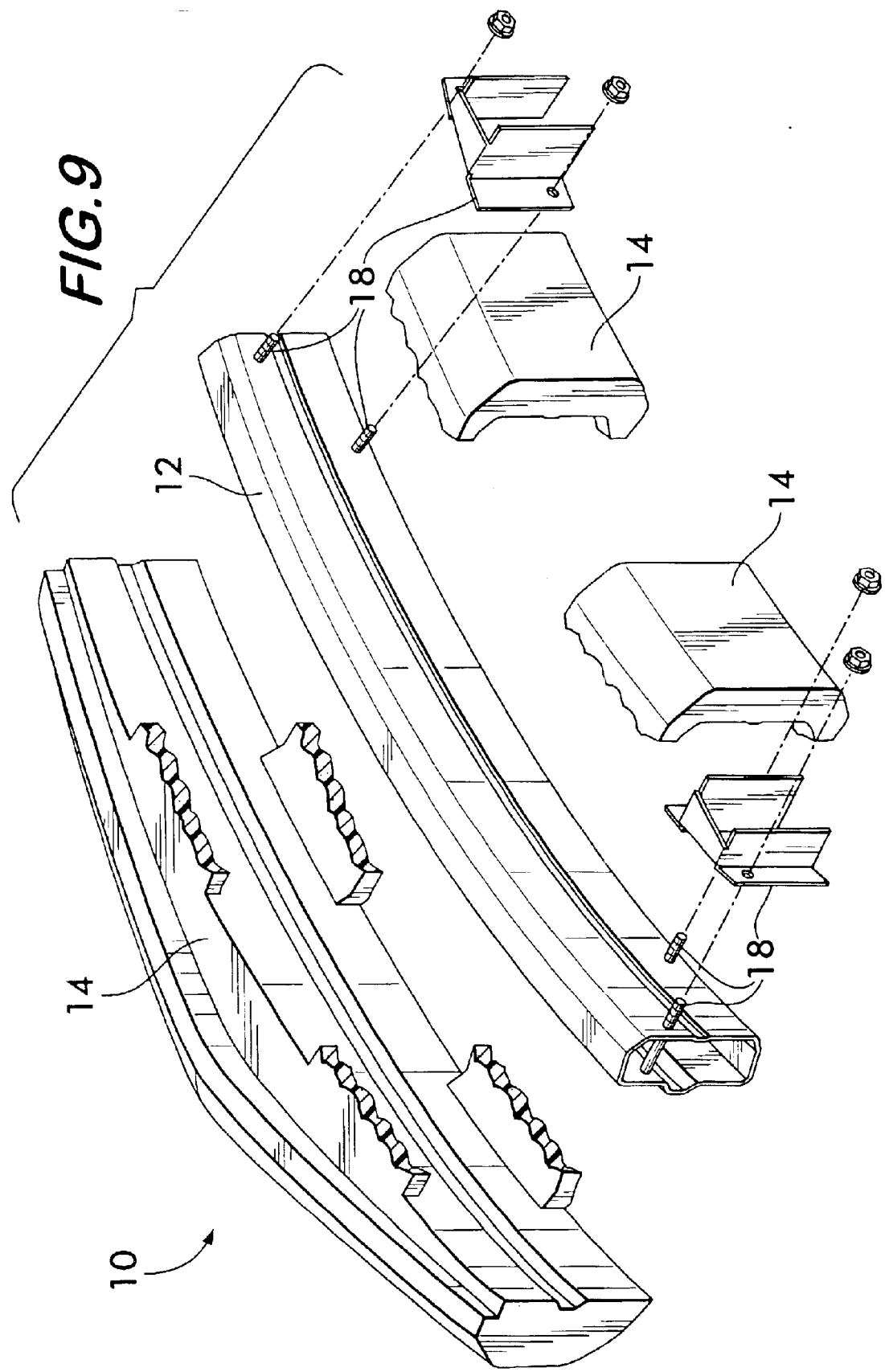
FIG. 9 is an exploded, isometric view of the vehicle bumper energy absorber system of FIG. 8.

FIG. 5 depicts a simplified example of a tooling configuration 24 to manufacture the vehicle bumper energy absorbing system 10 of the present invention which allows for a generally standard compression chest molding process to be used to encapsulate the reinforcing member 12 with the bead foam 14. A particular bumper energy absorbing system 10 design, i.e., its unique shape, will require unique mold cavities as well as unique mounting hardware. Each bumper energy absorbing system 10 design will also require a unique set of process conditions to assure a high quality design, capable process and robust design. Locations of bead injectors 26 and part ejectors 28 in either the male mold half 30 or female mold half 32 of the mold cavity 34 may be used. Additional components (not shown) may be added to the tooling to facilitate multiple densities to be contained within the molded bumper energy absorber system, depending on individual part designs and vehicle requirements.

An example of a preferred embodiment of the process is as follows. A pair of mold halves, male mold half 30 and female mold half 32, is provided that close to form a mold cavity 34 adapted to be used in a steam chest molding process. The steam chest 36 is adjacent to the mold halves 32, 30. A reinforcing member 12 is provided in the mold cavity such that foam beads 14 will ultimately encapsulate the reinforcing member 12. This can be accomplished, for example, by suspending the reinforcing member 12 within the mold cavity 34. Foam beads are applied into the mold cavity such that the reinforcing member is encapsulated by the foam on at least one side. The foam beads are then densified within the mold cavity using the steam chest molding process thereby creating a one-piece system 10. The reinforcing member 12 may be temporarily positioned within the mold cavity 34 to allow the bead foam 14 to be injected around or within it, thereby encapsulating it. The step of densifying the foam beads within the mold cavity may include utilizing mechanical pressure through the use of telescoped mold cavity 34 whereby foam beads are injected into the mold cavity and the mold cavity 34 is further reduced in size, thereby further compressing the foam beads, i.e., "crack fill" as known in the industry. Alternatively or additionally, densifying the foam beads may occur within the mold cavity and include utilizing air pressure through the use of pressurized air within the range of, for example, 0.5 bar to 5.0 bar, i.e., "pressure fill" as known in the industry.

A steam chest or compression chest molding process, as known in the art, may be used which uses injection of high pressure steam within the range of, for example, 1.5 to 5.5 bar into mold cavity through vents contained within the mold cavity 34 subsequent to the step of applying foam beads into the mold cavity.

A single molding tool containing multiple mold cavities may be used instead of the single cavity 34 as described. The foam beads may be densified to a final foam density of, for example, between about 20 grams/liter and 350 grams/liter, or, for example, between about 15 grams/liter and 300 grams/liter. Optionally, the step of densifying the foam beads may include densifying the foam beads to several different foam densities, for example, up to about three different foam densities, within the same part.

The mold halves may be cooled, utilizing, for example, water, to facilitate proper annealing of the expanded bead foam in and/or around the reinforcing member.

Now, the assembly of the vehicle bumper energy absorbing system 10 of the present invention will be described with more detail. First, the reinforcing member 12 is formed, for example, roll-formed, into its final shape, as seen above in FIG. 4A. The holes and/or slots 22 are then formed in the reinforcing member 12. Optionally, if the reinforcing member 12 is of a tube shape like that of FIG. 4E, a secondary operation may be made wherein the interior of the reinforcing member is filled with polyurethane (PU) 36 by a "wand" that inserts the PU into the internal conduit. Here the wand is inserted into an orifice in the reinforcing member, PU is metered into a bubble within the reinforcing member and the "wand" is retracted. The end result is PU inside the metal reinforcing member 12. For example, this may be +/−150 mm form the insertion point.

Now, there are two options for proceeding. The first is without male core vents and the second is with male core vents.

If male core vents are used, the following steps may be taken in accordance with the present invention.

1. The pre-rolled metal reinforcing member 12 is provided having holes and or slots 22.
2. The reinforcing member 12 and other inserts, such as fasteners 18, if any, are loaded into the mold cavity 34 of an EPP press.
3. The male mold half 30 and the female mold half 32 of the press are opened.
4. The reinforcing member 12 is located, as desired, for example, about one inch offset from the surface of the male mold half 30 to allow for beads to encapsulate the reinforcing member 12.
5. Pre-steam, to heat up the mold and reinforcing member, is injected into the mold cavity 34.
6. EPP beads (of a first density, if using more than one density) are injected into the mold cavity 34.
7. If the bumper system requires additional densities, EPP of one or more different densities is injected into the mold cavity.

There may be several fill-guns from the moving/male mold half 30. These fill-guns blow beads inside the mold cavity (i.e., within the central orifice of a tube type reinforcing member 12E) in local areas of the reinforcing member 12E. For purposes of the present invention, this is referred to as "incapsulation" described above). Some applications may require EPP inside the entire beam length. This may be a unique density or densities or may be one or more of the densities used on the outside of the reinforcement beam.

8. Cross-steam is then provided through the male mold half 30 side. This may be accomplished in accordance with the present invention in two primary ways. First, steam from the moving (male mold half 30) goes from the steam chest through "special fill gun tips" or "steam mandrels" to the beads inside the beam, through or adjacent to the reinforcing beam, through the EPP Energy absorber portion, through the fully core-vented female tool half, inside the fixed (female mold half 32) of the chest, and down the fixed side drain (which is full open, or partially open). Cross steam though the female mold half 32 is not required. There are preferably no core vents in the male tool, so no steam can reach the male chest and go into the drain.

Optionally, steam from male mold half 30 goes from the steam chest through the regular core vents to the beads inside the mold cavity 34 and the beads on the outside of the beam, through or adjacent to the reinforcing member 12, through an EPP energy absorber portion, then through a fully core-vented female mold half 32, inside the fixed (male mold half 30) side chest, and down the fixed side drain (which is full open, or partially open). Cross steam is then passed through the female mold half 32, as follows:

a. The male mold half 30 drains open (i.e., is partially opened);
b. Fixed side drains are closed;
c. Steam from the female mold half 32 goes from the steam chest 36 through the regular core vents to the beads inside the reinforcing member 12 and the beads on the outside of the reinforcing member 12, through or adjacent to the reinforcing member 12, through the EPP energy absorber portion, through the fully core-vented male mold half 30, inside the moving side chest, and down the moving side drain (which is full open, or partially open).

9. An autoclave step now occurs in which moving and fixed side drains are closed. Steam is applied.
10. The mold is cooled or allowed to cool.
11. The male mold half 30 and the female mold half 32 are opened.
12. The vehicle bumper energy absorbing system 10 is removed from the press.

As indicated, a fascia 20 of, for example, a polymer or other material may be applied to at least one surface of the foam beads within the mold. This fascia 20 could be the final outer surface if the system 10 is used as an automobile bumper. Preferably all of the steps indicated herein occur in a single molding operation, including, or not including, the step of providing the fascia, as will be described below.

In an alternate preferred embodiment of a vehicle bumper energy absorber system 50 of the present invention, a fully integrated molded bead foam 52 and reinforcing member 54, similar to that as described above, is combined with an integrated fascia 56. Here, these three components, i.e., the bead foam 52, reinforcing member 54, and fascia 56, are combined into a single unit.

The present invention makes use of "laminated' technology whereby the fascia 56 (for example, a single component or multi-component laminated thermoplastic polyolefin (TPO) is mechanically bonded to the surface of the bumper energy absorber system 50 (as described in more detail above with respect to the first embodiment of the bumper energy absorber system. 10). This is accomplished through the use of standard compression chest molding technology (also described above) as is well known in the art, coupled with vacuum forming the thermoplastic polyolefin (TPO) material (commonly referred to as 'skin'), whereby the finished product is a single component, fully integrated, vehicle bumper energy absorber system 50.

The embodiments of the vehicle bumper energy absorber systems 10, 50 of the present invention offer numerous advantages over those of the prior art. First, the present invention allows for the substantial reduction of parts necessary to comprise a vehicle bumper system. Assembly time necessary to install the bumper assembly is therefore substantially reduced. The present invention allows for the integration of the bumper to vehicle frame fasteners to the molded system, further eliminating parts and assembly steps. The present invention also allows the finished vehicle bumper energy absorber system 10, 50 to be shipped directly to the location of final vehicle, without any intermediate steps required.

This vehicle bumper energy absorber system 10, 50 of the present invention provides for a reduction in total bumper system weight, due to the integration and optimization of the components into a single piece energy absorption system.

The vehicle bumper energy absorbing system 10, 50 of the present invention is designed as an integrated replacement for an existing vehicle bumper system which is traditionally made up of a bumper energy absorber, typically comprised of a molded polypropylene foam bumper core, mounted (using fasteners) to a metal (usually roll formed high strength steel) or plastic beam; which is mounted (again, using fasteners) to the vehicle frame rail, all of which is covered by a fascia, typically a painted thermoformed TPO article.

The present invention allows for the bumper energy absorber system 10, 50 to be designed to meet the Federal Motor Vehicle Safety Standards (FMVSS) as well as the OEM requirements for total vehicle system design loading and allowable stroke. It will facilitate the ability to design the bumper energy absorber system to meet the various industry safety standards, including the National Highway Safety and Transportation Authority (NHSTA) and Insurance Institute for Highway Safety (IIHS) standards.

The present invention also allows flexibility in the bumper system design, in that the performance of the system can be modified by simply utilizing a different bead foam density, without any tooling modification, and will minimize process modification. This allows for commonization of the bumper reinforcing member, and will allow for fast turn-around time for bumper system development.

Finally, the present invention is adapted to prevent any component separation during vehicle impact, due to the fact that the resulting system components are encapsulated.

Some other advantages of the present invention are as follows:

Parts consolidation—many parts are formed in a single molding operation such that the number of loose parts or pieces required to go to a vehicle assembly plant are is minimized.

Lower tooling costs.

Decrease in number of environmental issues. For example, when compared with cars using polyurethane (PU), issues related to use of PU (for example worker exposure) are eliminated.

The ability to prototype is increased, for example, when using injection molded materials.

Quality control may be improved in some cases.

Cycle time may be improved in some cases.

Beam thickness may be decreased in some cases, thereby reducing overall system mass.

An added benefit of the present invention is to provide the option of utilizing laminated technology whereby the fascia material (for this application, typically single component or multi component laminated TPO) is mechanically bonded to the surface of the above-mentioned system. This is accomplished through the use of steam chest molding technology (also described above), coupled with vacuum forming the referenced TPO material (commonly referred to as 'skin'), whereby the finished product is a single component, fully integrated, bead foam bumper energy absorber, reinforcing member(s), and fascia combination (described above as a 3 component system).

It will be appreciated by those skilled in the are that modifications may be made to this invention without departing from ideas and concepts contained herein. Any modifications to these ideas and concepts are to be considered covered in those claims unless specifically stated otherwise.

What is claimed is:

1. A vehicle bumper energy absorbing system comprising steam chest molded foam, at least one integral reinforcing member, said reinforcing member having a closed cross section forming at least one central orifice, and at least one mounting bracket, said molded foam at least partially encapsulating said reinforcing member and said molded foam incapsulated within the central orifice of said reinforcing member, said integral reinforcing member and said at least one mounting bracket separated by a portion of the molded foam such that said molded foam absorbs impact energy and distributes impact forces to said at least one reinforcing member, said reinforcing member distributes impact forces to said portion of the molded foam, and said portion of the molded foam distributes impact forces to said at least one mounting bracket.

2. The vehicle bumper energy absorbing system of claim 1, wherein said at least one reinforcing member is fully encapsulated in said molded foam.

3. The vehicle bumper energy absorbing system of claim 1, wherein said system includes fasteners to enable said vehicle bumper energy absorbing system to be mounted to a vehicle frame.

4. The vehicle bumper energy absorbing system of claim 3, wherein said fasteners are integral to said molded bead foam.

5. The vehicle bumper energy absorbing system of claim 3, wherein said fasteners are integral to said reinforcing member.

6. The vehicle bumper energy absorbing system of claim 1, wherein the vehicle bumper energy absorbing system is adapted to be manufactured in a single step process.

7. The vehicle bumper energy absorbing system of claim 1, wherein said at least one reinforcing member is a rolled beam.

8. The vehicle bumper energy absorbing system of claim 1, wherein said at least one reinforcing member is an extruded shaped beam.

9. The vehicle bumper energy absorbing system of claim 1, wherein said at least one reinforcing member is a molded beam or plate.

10. The vehicle bumper energy absorbing system of claim 1, wherein said at least one reinforcing member is a thermoformed beam comprised of metal.

11. The vehicle bumper energy absorbing system of claim 1, wherein said at least one reinforcing member is made from a plastic material.

12. The vehicle bumper energy absorbing system of claim 1, wherein said at least one reinforcing member is a composite blend.

13. The vehicle bumper energy absorbing system of claim 1, wherein said at least one reinforcing member has a plurality of holes therethrough where said molded bead foam is located in said holes.

14. The vehicle bumper energy absorbing system of claim 1, wherein said at least one reinforcing member has barbs on one or more outer surface for enhanced securement of the molded bead foam to the reinforcing member.

15. The vehicle bumper energy absorbing system of claim 1, including a fascia layer located adjacent at least one surface of the bumper energy absorbing system, said fascia being integral to the vehicle bumper energy absorbing system.

16. The vehicle bumper energy absorbing system of claim 1, wherein said reinforcing member fully extends between at least two vehicle mounting brackets that are attached to a vehicle frame.

17. The vehicle bumper energy absorbing system of claim 1, wherein said molded foam at least partially encapsulates said reinforcing member and said molded foam is filly incapsulated within the central orifice of said reinforcing member.

18. A vehicle bumper energy absorbing system comprising steam chest molded foam, at least one integral reinforcing member, said reinforcing member having a closed cross section forming at least one central orifice, and a plurality of mounting brackets, said reinforcing member fully extending between the mounting brackets, said molded foam at least partially encapsulating said reinforcing member and said molded foam incapsulated within the central orifice of said reinforcing member, wherein said molded foam is adapted to absorb impact energy and distribute impact forces to said at least one reinforcing member.

19. The vehicle bumper energy absorbing system of claim 15, wherein the fascia layer is formed of a material that is thermally matched to the molded foam so that the fascia layer is attached to the foam by thermal bonding during steam chest molding.

* * * * *